Dec. 16, 1952  R. H. GRIGSBY  2,621,877
FISHING ROD TENDER
Filed Aug. 10, 1949
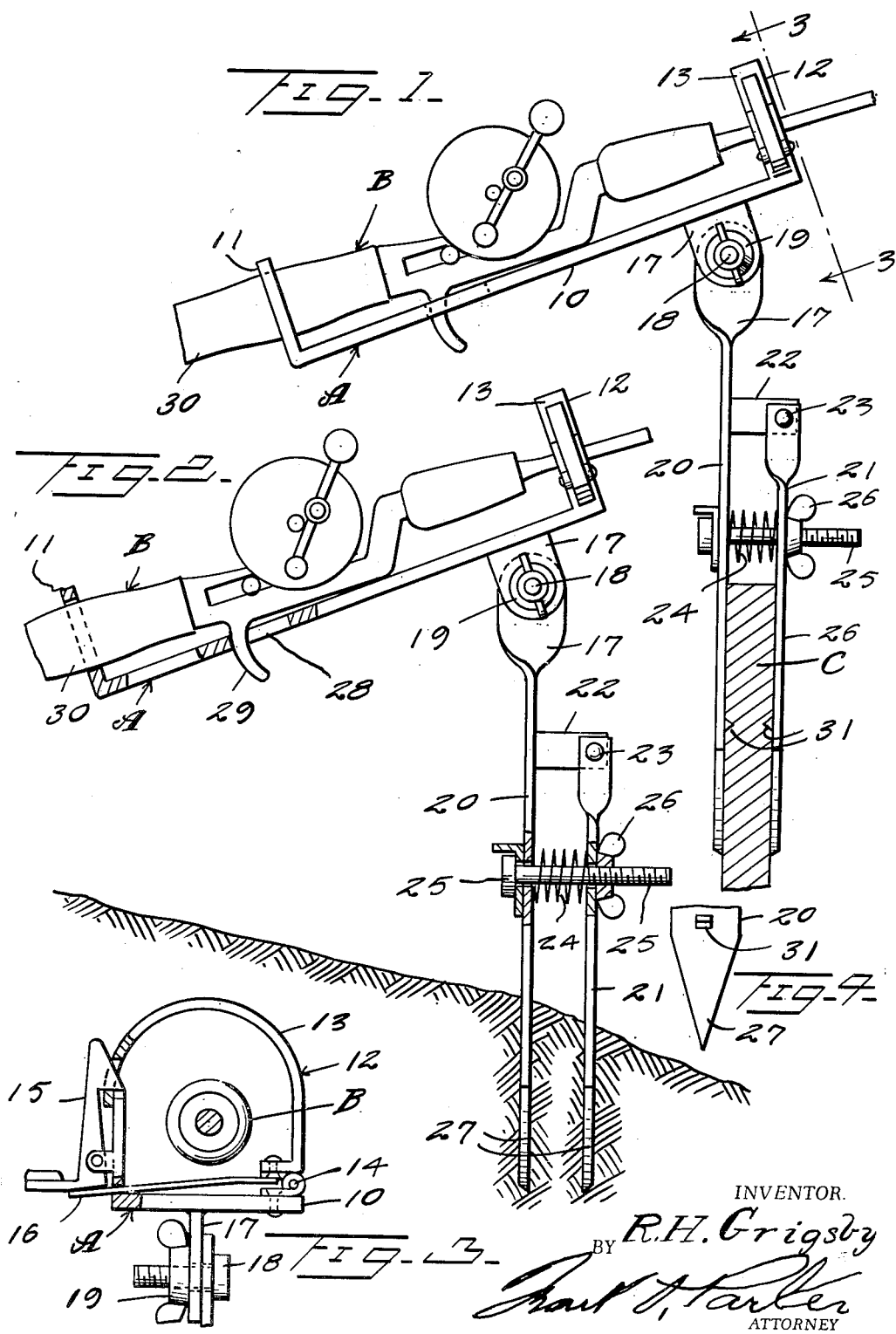
INVENTOR.
R. H. Grigsby
BY
ATTORNEY Patented Dec. 16, 1952

2,621,877

UNITED STATES PATENT OFFICE 2,621,877

FISHING ROD TENDER

Robert H. Grigsby, St. Charles, Va.

Application August 10, 1949, Serial No. 109,553

1 Claim. (Cl. 248—42)

The invention relates to a fishing rod tender, and more especially to a fishing rod holder or support.

The primary object of the invention is the provision of a holder or support of this character, wherein a fishing rod, pole or the like, can be conveniently held thereby at any required angle to the vertical or horizontal planes, and these positions can be maintained when within a boat or the like or on a shore, and thus eliminating the hand holding of such rod, pole or the like during the fishing period.

Another object of the invention is the provision of a holder or support of this character, wherein the fishing rod, pole or the like, may be readily engaged in or removed from the same, and such rod, pole or the like, when engaged in the holder or support it will be maintained in a proper position to permit the free handling of the reel, and the said holder or support will selectively function as a clamp for detachable association with the gunwale of a boat or for anchorage in the ground forming the bank or shore of a water bed.

A further object of the invention is the provision of a holder or support of this character, wherein the construction of the same is novel and unique in its entirety, and is most convenient for its purposes.

A still further object of the invention is the provision of a holder or support of this character, which is extremely simple in construction, reliable and efficient in operation, strong, durable, neat in appearance, possessed of few parts, conveniently manipulated, foldable into compact form when not in use for storage in the least possible space, assuring firm and secure anchorage when in use, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claim hereunto appended.

In the accompanying drawing:

Figure 1 is an elevation of the holder or support constructed in accordance with the invention, and showing fragmentarily a fishing rod held thereby when supported by the gunwale of a boat.

Figure 2 is a substantially similar view to Figure 1, showing the holder or support anchored in the ground.

Figure 3 is a sectional view taken approximately on the line 3—3 of Figure 1, looking in the direction of the arrows.

Figure 4 is a fragmentary elevation of the tapered pointed end of one of the legs of the holder or support.

Similar reference characters indicate corresponding parts throughout the several views in the drawing.

Referring to the drawing in detail, the holder or support constituting the present invention is designated generally at A, while the fishing rod, pole or the like, is indicated generally at B, respectively.

The holder of support A comprises, a substantially straight elongated rigid strap-like plate or member 10, which is of narrow uniform width throughout its length, and of any required thickness, having at one end a permanently closed eye-like loop 11, which is disposed at substantially right angles to the plane of the plate or member, while at the other or opposite end of the latter is a jawed opening and closing clamp 12, which is angled correspondingly to the loop 11, and its arched jaw 13 is hinged at 14 for opening and closing such clamp 12. This jaw 13 is releasably latched by a spring tensioned hand released catch 15, the spring 16 therefor being for the snap latching of the catch for holding the jaw in closed position.

Depending from the plate or member 10, next to the clamp 12 is a pivot ear 17 for a wing-nut carrying bolt 18, the nut being indicated at 19, for adjustable connection to the ear 17 of an anchoring standard involving a pair of legs 20 and 21, respectively, the leg 21 being spaced from the leg 20 by an offset 22, to which it is pivoted at 23, so that the legs will swing toward and away from each other. The wing-nut carrying bolt 18 allows the plate or member 10 to be adjusted angularly to the horizontal or vertical at any required or desired degree, as should be obvious.

The legs 20 and 21 are spread apart by the action of a coiled spring 24 about a nut carrying binding bolt 25, loosely trained through clearances in said legs, the nut for the bolt 25 being identified at 26, and the outer free ends 27 of these legs being tapered to a point for the driving thereof into the ground or earth, so that the standard can be anchored therein, whereby the holder or support A will be maintained secure at such place, either a bank shore or water bed.

The legs 20 and 21 permit the clamping of the holder or member A securely onto a gunwale C, of a boat or the like, as should be clearly apparent from the drawing, in Figure 1 thereof.

The member or plate 10 at the required area removed from the loop 11 has formed therein a suitable slot 28, in which is inserted the finger hold 29 near the handle end 30 of the fishing rod, pole or the like B, which carries the usual line reel, and this rod, pole or the like, has its handle end 30 engaged in the said loop 11 when resting superimposed on the said plate or member 10, with the said rod, pole or the like latched in the clamp 12, for firm holding by the holder or support A, as should be clearly apparent in Figures 1 and 2, of the drawing.

The rod, pole or the like B can be disposed at any angle to the vertical or horizontal by the holder or member A on the required adjustment of the plate or member 10 with relation to the standard involving the legs 20 and 21, respectively, which are anchored as before mentioned, either in the ground or onto the gunwale of a boat or the like.

The legs 20 and 21 at their inner faces are suitably barbed as at 31 to assure a firm grip on the gunwale of the boat or the like.

What is claimed is:

A fishing rod tender for a fishing rod having a grip trigger, comprising: a double jaw supporting member, a substantially U-shaped bracket adjustably connected uppermost on the supporting member and having a slot midway thereof for accommodating and anchoring a grip trigger of a fishing rod when the latter is interconnected with extremities of the bracket to eliminate undue longitudinal thrust of the rod in reverse directions, said bracket having two ends, one of said ends comprising a member adapted to encircle one end of a fishing rod, the opposite end of said bracket having a clamp means pivoting one end of said clamp to said bracket, said clamp having an opening, a spring-tensioned catch, means for pivotally mounting said catch on said clamp, said catch having a nose adapted to engage in said opening, said catch having an extension forming a finger piece and spring means mounted adjacent said first pivot and engaging the underside of said catch extension whereby to hold said catch in engagement with said aperture.

ROBERT H. GRIGSBY.

REFERENCES CITED

The following references are of record in the file of this patent:

UNITED STATES PATENTS

| Number | Name | Date |
| --- | --- | --- |
| 1,256,191 | Wittkowski | Feb. 12, 1918 |
| 1,876,478 | Van Duzer | Sept. 6, 1932 |
| 2,204,692 | Parisio | June 18, 1940 |